No. 743,703. PATENTED NOV. 10, 1903.
E. W. FLAGG.
THRESHING MACHINE.
APPLICATION FILED JUNE 22, 1903.
NO MODEL.

Witnesses
Edwin F. McKee
F. W. Riley

Inventor
Eli W. Flagg
By Rexford M. Smith,
Attorney.

No. 743,703.

Patented November 10, 1903.

UNITED STATES PATENT OFFICE.

ELI W. FLAGG, OF BATTLECREEK, MICHIGAN, ASSIGNOR TO NICHOLS AND SHEPARD COMPANY, OF BATTLECREEK, MICHIGAN.

THRESHING-MACHINE.

SPECIFICATION forming part of Letters Patent No. 743,703, dated November 10, 1903.

Application filed June 22, 1903. Serial No. 162,649. (No model.)

*To all whom it may concern:*

Be it known that I, ELI W. FLAGG, a citizen of the United States, residing at Battlecreek, in the county of Calhoun and State of Michigan, have invented a certain new and useful Threshing-Machine, of which the following is a specification, reference being had therein to the accompanying drawings.

This invention relates to threshing-machines, and is in the nature of an improvement upon the construction illustrated and described in my Reissue Patent No. 11,965, dated February 4, 1902, the object of the present invention being to simplify the construction of the device for arresting the flying kernels as they leave the threshing-cylinder and directing the same downward into the grain-pan.

In my prior patent referred to I employed a grate steeply inclined in close proximity to the sweep of the cylinder-teeth and arranged directly in rear of the cylinder, while behind the grate there was arranged a checking and directing plate which stopped the flying kernels after passing through the grate and caused them to be delivered into the grain-pan. Under the present improvements the checking and directing device is formed in one with the grate itself, thereby economizing in space, reducing the cost of manufacture, and simplifying the device as a whole, while accomplishing the same good results heretofore obtained.

With the above and other objects in view, the nature of which will more fully appear as the description proceeds, the invention consists in the novel construction, combination, and arrangement of parts, as hereinafter fully described, illustrated, and claimed.

Figure 1:
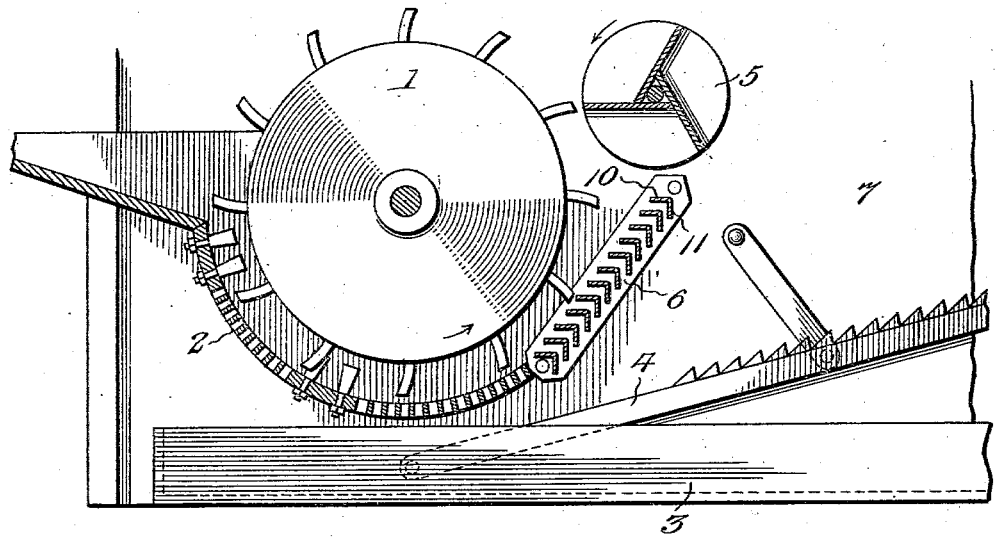
Figure 2:
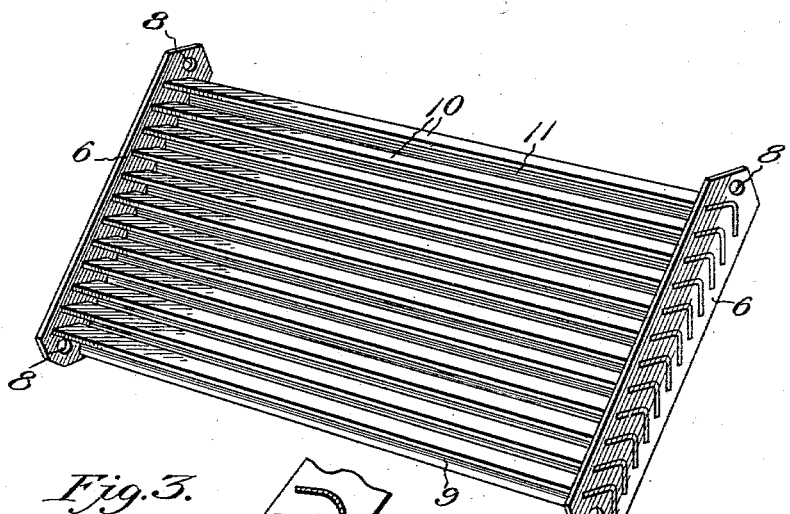
Figure 3:
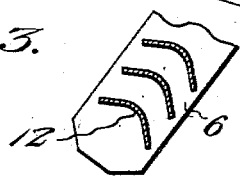

In the accompanying drawings, Figure 1 is a vertical longitudinal section through a sufficient portion of a threshing-machine to illustrate the nature and application of the present invention. Fig. 2 is an enlarged detail perspective view of the combined grate and grain-checking device, and Fig. 3 is a detail section showing a slight modification in the form of the angle bars or slats.

Like reference-numerals designate corresponding parts in all the figures of the drawings.

Referring to the drawings, 1 designates the threshing-cylinder of a cylinder-and-concave threshing-machine, 2 the concave, 3 the grain-pan, 4 one of the straw-carrier sections, and 5 the beater arranged in rear of the cylinder and adjacent to the upper end of the grate, the said parts being of the ordinary construction and arrangement.

In carrying out the present invention I employ a combined grate and grain checking and directing device, (illustrated in detail in Fig. 2,) which grate is steeply inclined in close proximity to the sweep of the cylinder-teeth, as shown in Fig. 1, said grate forming, in effect, a rearward continuation of the concave and extending from the rear edge of the concave proper upward at a steep inclination toward and terminating in proximity to the beater 5.

The grate in the preferred embodiment of this invention comprises the frame or end pieces 6, which lie in close proximity to the side walls 7 of the threshing-machine casing and are connected therewith by means of suitable fastening devices which pass through openings 8 in said end pieces 6, although the grate as a whole may be mounted within and secured to the casing of the machine in any other or preferred way. Extending between the end pieces 6 are what may be termed "angle bars or slats" 9, the said slats being arranged one above the other in the manner of steps and extending in parallel relation to each other, as clearly shown in Figs. 1 and 2. Each slat comprises a forwardly-extending portion 10, which in reality forms the grate-bar proper and against the forward edge of which the straw moves as it is carried upward by the action of the threshing-cylinder. Each slat also comprises a pendent portion 11, which extends downward and preferably overlaps the next lower grate bar or slat, so as to catch and check the flying kernels as they pass between the grate-bars and direct the same downward, causing said kernels to fall directly into the grain-pan 3 and avoiding and preventing said kernels from being carried far enough to again mingle with the straw as it falls upon the first straw-carrier section 4.

The angle bars or slats (shown in Fig. 1) are substantially right angular. If desired, the portions 10 and 11 of each slat or bar may extend at an obtuse angle to each other, as shown in Fig. 3, and the angle 12 between the parts 10 and 11 may either be abrupt, as shown in Figs. 1 and 2, or rounded, as shown in Fig. 3.

It is not necessary that the portion 10 of each slat extend horizontally or that the portion 11 extend vertically, the essential feature of the invention being that the slats be so constructed and arranged as to allow the flying kernels to pass between them and yet be arrested or checked by the rear pendent portion of each slat, so as to prevent the grains passing again into the straw in rear of the grate and causing said grains to fall directly downward into the grain-pan.

By means of the construction hereinabove described it is unnecessary to place a checking and directing plate in rear of the grate, as the grate bars or slats themselves serve as a checking and directing device, allowing the kernels to pass between the grate-bars and yet causing them to be delivered directly downward into the grain-pan.

Having thus described the invention, I claim as new—

The combination with a cylinder-and-concave threshing-machine, in which the concave extends well toward the rear of the cylinder, of a grate steeply inclined in close relation to the sweep of the cylinder-teeth and forming an extension of the concave, said grate embodying a series of parallel angle bars or slats having substantially horizontal portions extending toward the cylinder and pendent portions or flanges which extend downward and overlap each other in such manner as to prevent the kernels from flying through the grate and out into the straw.

In testimony whereof I affix my signature in presence of two witnesses.

ELI W. FLAGG.

Witnesses:
CHESTER P. ALDRICH,
ALFRED H. HULSCHER.